US012808900B2

(12) United States Patent
Morris et al.

(10) Patent No.: US 12,808,900 B2
(45) Date of Patent: Nov. 24, 2026

(54) METHODS FOR FEEDBACK DETECTION OF A MEMS ARRAY

(71) Applicant: ICSPI Corp., Waterloo (CA)

(72) Inventors: David Morris, Kitchener (CA); Zhenle Cao, Kitchener (CA); Mahdi Olfat, Kitchener (CA)

(73) Assignee: ICSPI Corp., Kitchener (CA)

( * ) Notice: Subject to any disclaimer, the term of this patent is extended or adjusted under 35 U.S.C. 154(b) by 376 days.

(21) Appl. No.: 18/647,295

(22) Filed: Apr. 26, 2024

(65) Prior Publication Data

US 2024/0361351 A1 Oct. 31, 2024

Related U.S. Application Data

(60) Provisional application No. 63/462,394, filed on Apr. 27, 2023.

(51) Int. Cl.
*G01Q 30/02* (2010.01)

(52) U.S. Cl.
CPC .................................... *G01Q 30/02* (2013.01)

(58) Field of Classification Search
CPC ............................... G01Q 30/02; G01Q 70/06
See application file for complete search history.

(56) References Cited

U.S. PATENT DOCUMENTS 5,412,980 A * 5/1995 Elings .................... B82Y 35/00 977/851
6,196,061 B1 * 3/2001 Adderton ............... G01Q 70/04 977/852
6,590,852 B1 * 7/2003 McCormick, Jr. ..... B82Y 10/00 369/120
7,281,419 B2 * 10/2007 Wang ..................... G01Q 70/06 250/306
7,787,352 B2 * 8/2010 Bar-Sadeh ........... G11B 9/1409 369/140
7,877,816 B2 * 1/2011 Spizig .................... G01Q 10/06 977/851
8,910,311 B2 * 12/2014 Humphris .............. G01Q 70/06 850/1
10,197,595 B2 * 2/2019 Su .......................... G01Q 10/00

(Continued)

FOREIGN PATENT DOCUMENTS

CN 104965105 A * 10/2015
DE 69825226 T2 * 8/2005 ........... G01Q 10/112

(Continued)

OTHER PUBLICATIONS

AFM scanning modes—Max IV, https://www.maxiv.lu.se/beamlines-accelerators/support-labs/microscopy-labs/atomic-force-microscope/afm-scanning-modes, Accessed Apr. 24, 2024.

(Continued)

*Primary Examiner* — David A Vanore
(74) *Attorney, Agent, or Firm* — Kaplan Breyer Schwarz, LLP

(57) ABSTRACT

Distance-sensing techniques (between probes and a sample) utilize at least one of squeeze-film damping and temperature sensing for scanning probe microscopy. Squeeze-film damping may be used for "approach;" that is, z-position detection. It may also be used for "imaging;" that is, to obtain a topographic map of the surface of a sample.

15 Claims, 6 Drawing Sheets

(56) References Cited

U.S. PATENT DOCUMENTS

| | | | | |
|---|---|---|---|---|
| 10,712,364 | B2 * | 7/2020 | Cullinan | G01Q 10/04 |
| 11,237,187 | B2 * | 2/2022 | Kornilov | G01Q 70/06 |
| 2003/0003676 | A1 * | 1/2003 | Lee | B82Y 10/00 850/37 |
| 2003/0033863 | A1 * | 2/2003 | Ashby | G01Q 20/02 850/37 |
| 2003/0041657 | A1 * | 3/2003 | Degertekin | G01Q 60/32 73/105 |
| 2003/0041669 | A1 * | 3/2003 | Degertekin | G01N 29/346 73/105 |
| 2005/0185179 | A1 * | 8/2005 | Wang | G01J 3/433 356/330 |
| 2006/0257286 | A1 * | 11/2006 | Adams | G01N 29/022 422/82.01 |
| 2007/0220959 | A1 * | 9/2007 | Sumant | G01Q 70/14 73/105 |
| 2008/0011065 | A1 * | 1/2008 | Su | G01Q 10/045 73/105 |
| 2011/0167524 | A1 * | 7/2011 | Hu | H01R 13/6315 850/1 |
| 2011/0321202 | A1 * | 12/2011 | Kartik | G01Q 70/06 850/1 |
| 2014/0289911 | A1 * | 9/2014 | Humphris | G01Q 40/00 850/5 |
| 2014/0331368 | A1 * | 11/2014 | Cannara | G01Q 70/02 850/53 |
| 2015/0204904 | A1 * | 7/2015 | Beyeler | G01L 1/18 324/750.25 |
| 2017/0131323 | A1 * | 5/2017 | Sadeghian Marnani | G01Q 10/06 |
| 2018/0306846 | A1 * | 10/2018 | Lanzisera | G01R 33/06 |
| 2018/0321276 | A1 * | 11/2018 | Cullinan | G01Q 70/06 |
| 2018/0340775 | A1 * | 11/2018 | Kuisma | G01C 19/5642 |
| 2018/0340776 | A1 * | 11/2018 | Kuisma | G01C 19/5747 |
| 2021/0132370 | A1 * | 5/2021 | Kim | G02B 26/105 |
| 2023/0216266 | A1 * | 7/2023 | Pepper | H01S 3/1109 372/99 |
| 2024/0361351 | A1 * | 10/2024 | Morris | G01Q 30/02 |

FOREIGN PATENT DOCUMENTS

| | | | | | |
|---|---|---|---|---|---|
| EP | 2282218 | A1 | * | 2/2011 | G01Q 70/06 |
| JP | 2008300033 | A | * | 12/2008 | |
| WO | WO-02103328 | A1 | * | 12/2002 | G01B 9/02045 |
| WO | WO-2004068745 | A1 | * | 8/2004 | H04B 10/112 |
| WO | WO-2006039506 | A2 | * | 4/2006 | G01N 27/007 |
| WO | WO-2008112713 | A1 | * | 9/2008 | G03F 7/0002 |
| WO | WO-2009011709 | A1 | * | 1/2009 | B41J 2/16 |
| WO | WO-2013116508 | A1 | * | 8/2013 | G01Q 60/14 |
| WO | WO-2014033451 | A1 | * | 3/2014 | G11B 11/002 |
| WO | WO-2014057268 | A1 | * | 4/2014 | G01N 29/036 |
| WO | WO-2016189451 | A1 | * | 12/2016 | G01Q 60/38 |
| WO | WO-2017079375 | A1 | * | 5/2017 | G01Q 10/04 |
| WO | WO-2022075841 | A2 | * | 4/2022 | H01J 37/20 |

OTHER PUBLICATIONS

Yan Sun et al., “Squeeze Film Damping Effect on Different Microcantilever Probes in Tapping Mode Atomic Force Microscope,” Hindawi Scanning, Nov. 16, 2020, doi: 10.1155/2020/8818542, pp. 1-6, vol. 2020.

M. Olfat et al., “A Single-Chip Scanning Probe Microscope Array”, Published in: 2017 IEEE 30th International Conference on Micro Electro Mechanical Systems (MEMS), Publisher: IEEE, Date of Conference: Jan. 22-26, 2017, 4 pp.

Zhenle Cao et al., “Parallel MEMS AFM for High-Throughput Semiconductor Metrology and Inspection”, Proceedings vol. 12496, Metrology, Inspection, and Process Control XXXVII; 1249638 (2023), https://doi.org/10.1117/12.2658485, Event: SPIE Advanced Lithography + Patterning, 2023, San Jose, California, United States, Published Apr. 27, 2023, 7 pp.

Neil Sarkar et al., “A 0.25mm Atomic Force Microscope On-A-Chip”, MEMS 2015, Jan. 18-22, 2015, 4 pp.

* cited by examiner

METHODS FOR FEEDBACK DETECTION OF A MEMS ARRAY

STATEMENT OF RELATED CASES

This specification claims priority to U.S. Ser. No. 63/462,394, which was filed Apr. 27, 2023 and which is incorporated by reference herein.

FIELD OF THE INVENTION

The present invention pertains to MEMS-based sensing.

BACKGROUND OF THE INVENTION

Microelectromechanical systems (MEMS) devices have numerous applications across diverse industries. One broad category of applications involves the field of sensing. In that context, MEMS arrays can be used as metrology and inspection tools for semiconductor packaging, memory technologies, power electronics, nano- and micro-structured patterns and molds, nanoimprinted materials, optics, and photonic devices, etc.

One challenge that arises for many MEMS sensing applications is a requirement to align multiple MEMS devices to a sample along multiple axes, especially the pitch, roll and Z axes, but not excluding X, Y or yaw axes. This alignment is required so that the MEMS sensing devices can interact with a sample, such as to collect data or even physically alter it, such as when using the MEMS device as a lithography tool.

SUMMARY

The present invention provides systems and methods for at least z-axis positioning of an array of MEMS devices; that is, for sensing the distance between the MEMS devices and the surface of a sample.

In the illustrative embodiment, systems and methods in accordance with the present teachings are applied to scanning probe microscopy; in particular, to a MEMS scanning probe microscope (SPM) comprising one or more arrays (typically, but not necessarily 2D arrays) of MEMS SPM devices (also referred to herein as a "MEMS SPM array"). However, as will be understood to those skilled in the art, the systems and methods presented herein may be used for a wide variety of applications that require z-axis positioning/distance-sensing of an array of MEMS devices.

The distance-sensing techniques described herein primarily utilize one or both of the following methodologies: squeeze-film damping (SFD) and temperature sensing, neither of which has conventionally applied as described herein. In fact, quite the opposite.

In the context of the scanning probe microscopy, SFD is being used for two different purposes. One purpose is SFD "approach," which is used for Z-position detection. The second purpose is SFD "imaging mode," wherein SFD is used for collecting a topographic map of the surface of a sample. Both pertain to distance (z-axis) sensing, but the specific application is different.

Of course, z-positioning using MEMS structures is well known. But in the context of SPM, z-positioning is conventionally limited to the extreme near-field, typically less than 20 nanometers (nm). In this distance regime, SFD has historically been viewed as a nuisance, such as in the operation of atomic force microscopes (AFM). See, e.g., Y. Sun, J. Liu, K. Wang, and Z. Wei, "Squeeze Film Damping Effect on Different Microcantilever Probes in Tapping Mode Atomic Force Microscope," Scanning, vol. 2020, pp. 1-6, November 2020, doi: 10.1155/2020/8818542.

But applicant is using SFD to its advantage. Specifically, applicant has discovered a technique by which squeeze-film damping can, quite unexpectedly, be used to coarsely measure the substrate topography for long-range alignment (greater than 1 micron) from the substrate. In fact, embodiments of the invention extend the distance-sensing range to greater than 50 microns (μm).

As previously noted, a second methodology for long-range distance sensing is temperature sensing; that is, using thermal interactions between the MEMS devices and the surface of a sample. In some embodiments, the MEMS devices are resistively heated, either intentionally or due to their mode of operation. When near to a sample, the heat dissipates into the sample, and this heat flux is detected as a temperature change in the MEMS devices. This thermal flux can be correlated to the distance between the MEMS devices and the sample. In some embodiments, such thermal sensing is implemented by incorporating a temperature-sensitive polysilicon sensor into the MEMS devices, or the MEMS devices can contain a temperature-sensitive bimorph structure that applies mechanical deformation to a strain-sensitive polysilicon sensor.

In various embodiments, the present teachings provide: (i) a way to determine the multidimensional topography (i.e., shape) of a large-area sample from long (micrometer) to short (nanometer) MEMS SPM array-to-sample separation distances, (ii) move the MEMS SPM array and/or sample to maintain alignment (parallelism) therebetween, with optimized MEMS SPM array-sample distances, and (iii) implement scanning (measurement of, or interaction with) a sample via a unique, non-contact sensing approach.

In various embodiments, the invention provides:

- Methods for determining the relative position between a MEMS SPM array and a sample using the MEMS SPM array itself for sensing:
  - a. Via (i) squeeze-film damping (SFD) to achieve z-axis positioning at much greater distances than a typical atomic force microscope, (ii) thermal effect, or (iii) both methods (i) and (ii).
  - b. An ability to feed-back data from the MEMS SPM array and using the measured relative distances to an external system to correct for low order (0th-2nd) positional error, such as with a goniometer or deformation of the MEMS SPM array or sample.
- Methods for correcting and compensating for high order (typically 2nd order and above) curvature of the sample and/or MEMS SPM array using the MEMS SPM devices themselves ("on-chip sensing").
- Methods to feed-back global topography data (of the sample or the MEMS SPM array) from external sources (such as interferometry) into the MEMS SPM array and goniometer system ("off-chip" sensing for alignment):
  - a. To correct for low order (0th-2nd) positional error, such as with a goniometer or deformation of the MEMS SPM array or sample.
  - b. To compensate for high order (2nd order and above) curvature of the sample and/or MEMS SPM array using the MEMS SPM devices themselves.
- Methods to maintain relative position between a MEMS SPM array and sample during operation to mitigate mechanical drift and vibration, including the use of a spacer ring.

Methods of long-range topography-only sensing with MEMS SPM devices based on SFD ("SFD imaging mode"), or based on thermal effect, or both.

Design of a data/signal processing chain built into the MEMS array.

DETAILED DESCRIPTION

Figure 1A:
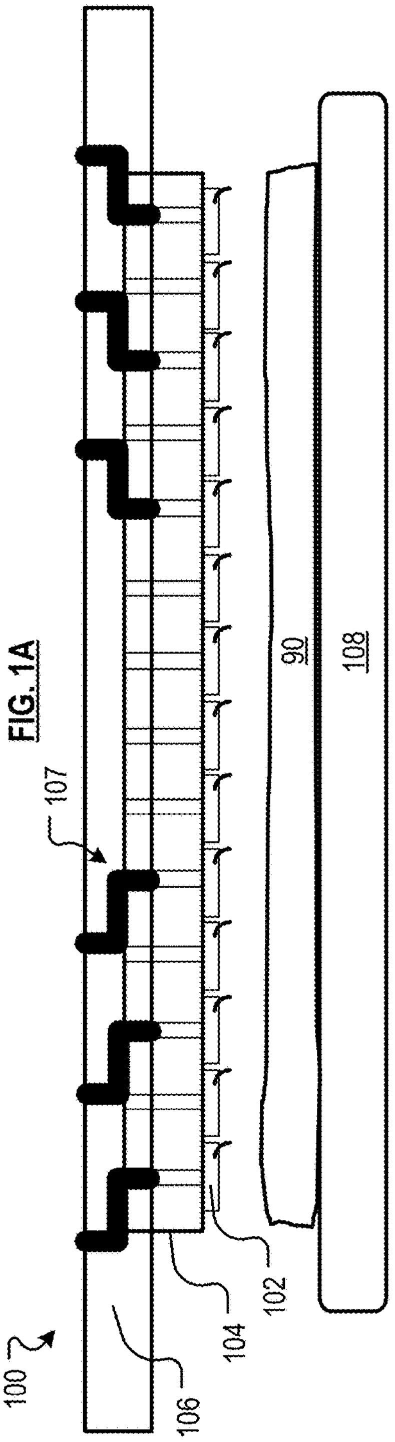
FIG. 1A depicts, via side view, a MEMS scanning-probe microscope (SPM) system in accordance with an illustrative embodiment.

FIG. 1A depicts a side-view of MEMS scanning-probe microscope (SPM) system 100 in accordance with an illustrative embodiment of the present invention. In this embodiment, MEMS SPM system 100 includes silicon wafer 104 having a plurality of MEMS SPM devices 102*i* i=1,n (hereinafter "MEMS SPM device(s) 102") on a front side thereof.

The back side of silicon wafer 104 is bonded to carrier substrate 106. Through-silicon vias (TSVs) 107 are used as interconnects to transfer power and data through carrier substrate 106, through silicon wafer 104, and to MEMS SPM devices 102. The carrier substrate may be, for example, a printed circuit board (PCB) or other suitably stiff substrate having electrical interconnects.

Figure 1B:
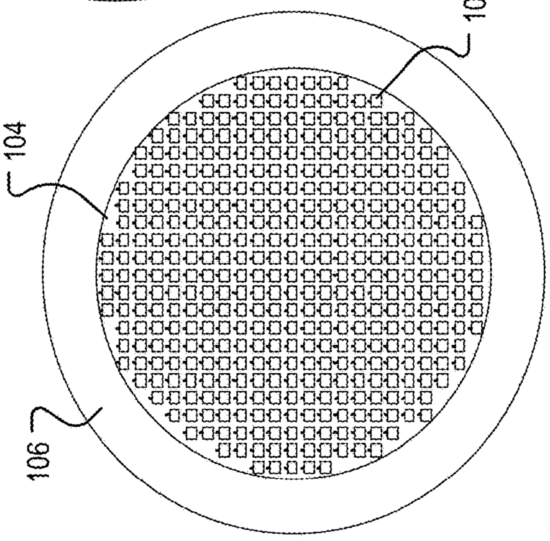
FIGS. 1B, 1C, and 1D depict various ways in which to organize the MEMS SPM devices that are used in conjunction with the MEMS SPM system of FIG. 1A.
Figure 1C:
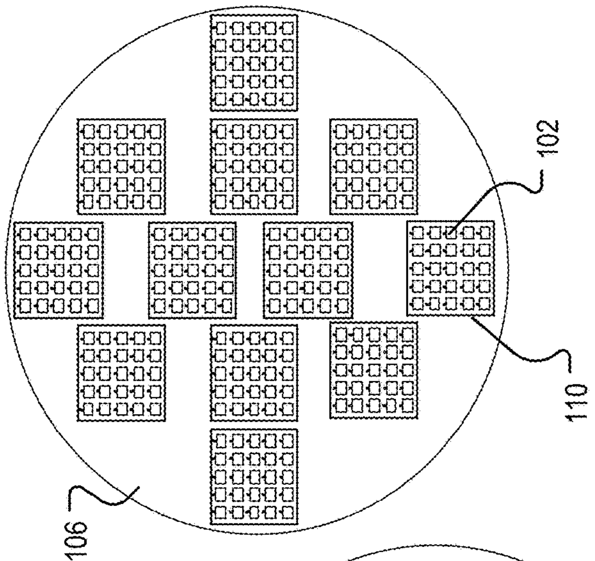
Figure 1D:
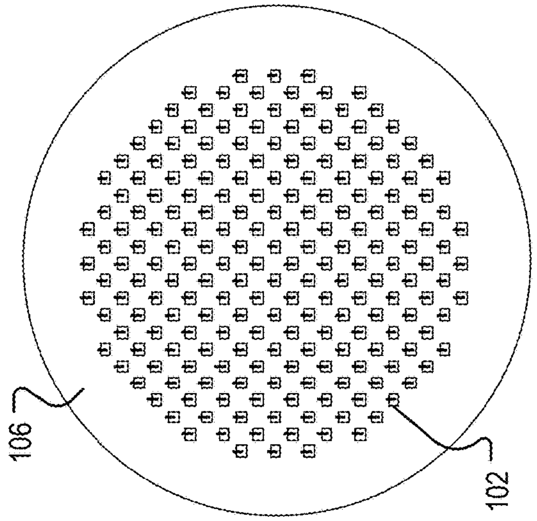

The MEMS SPM devices 102 may be organized in any of a variety of ways. In FIG. 1B, MEMS SPM devices 102 are organized as a monolithic array on silicon wafer 104. In the embodiment depicted in FIG. 1C, MEMS SPM devices 102 are organized as a plurality of relatively smaller arrays, each array on portion 110 of a silicon wafer. FIG. 1D depicts an array of "individual" MEMS SPM devices (sans wafer), each mounted directly to PCB substrate 106.

Several additional systems are associated with MEMS SPM system 100. One such system (not depicted) holds carrier substrate 106, and a carrier (chuck) for sample 90, the latter being the measured object. The carrier can be, for example and without limitation, a second silicon wafer. Additionally, MEMS SPM system 100 includes, in some embodiments, at least one 5-axes or 6-axes goniometer 108 for positioning MEMS SPM devices 102 and/or sample 90. Furthermore, a microcomputer/microcontroller system (not depicted) is used to supply signals to and receive signals from MEMS SPM devices 102, and to perform position calculations of MEMS SPM devices 102 to operate the goniometer.

Figure 2:
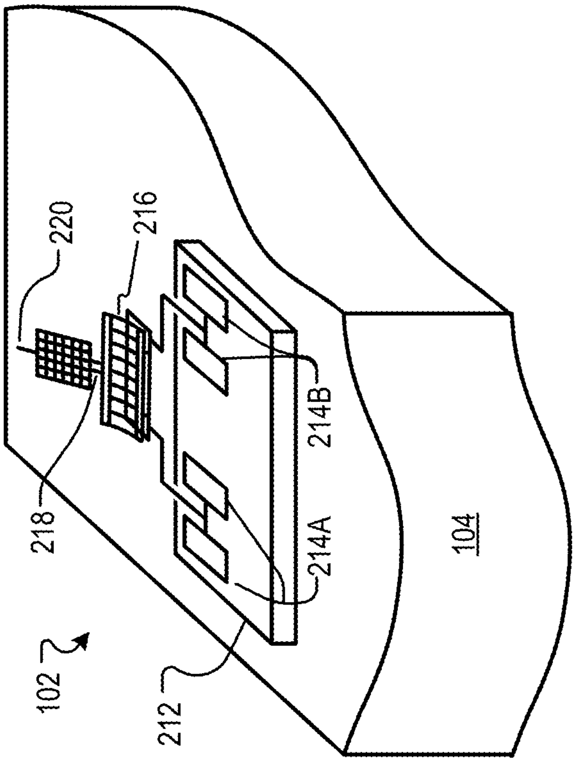
FIG. 2 depicts an embodiment of a MEMS SPM device, such as for use in conjunction with the MEMS SPM system of FIG. 1A.

FIG. 2 depicts an embodiment of MEMS SPM device 102 on a portion of wafer 104. Typically, wafer 104 is silicon, such as a 100 mm, 150 mm, 200 mm, or 300 mm silicon wafer. An array of MEMS SPM devices 102 are manufactured on wafer 104, such as via a well-known CMOS-MEMS manufacturing process.

In the illustrative embodiment, MEMS SPM device 102 includes electrically insulating (dielectric) layer 212, two paired x-y axes actuators 214A and 214B, z-axis actuator 216, piezoresistive sensor 218, and cantilever 220. In some embodiments, z-axis actuator 216 is an electrothermal bimorph actuator. By virtue of x-y axes actuators 214A and 214B, and z-axis actuator 216, cantilever 220 is movable in the X, Y, and Z directions.

MEMS SPM device 102 is one of many implementations useful for implementing the methods described herein. To maintain a focus on subject matter that is most germane to embodiments of the invention, MEMS SPM device 102 will not be described in further detail herein.

Z-axis Positioning. One specific family of sensing techniques is scanning probe microscopy (SPM), which includes, for example: atomic force microscopy (AFM), thermal sensing (scanning thermal microscopy, SThM), optical sensing (scanning nearfield optical microscopy (SNOM)), acoustic (scanning acoustic microscopy), electrical capacitance (scanning capacitance microscopy), and reflected radiofrequency signals (scanning microwave microscopy).

SPM uses at least one element that is positioned in contact with or near to a sample—typically less than about 1 millimeter (mm) away—to measure the sample with high lateral resolution (typically in the range of about 1 to 20 nm). A scanning probe microscope must be positioned within a certain distance of the sample along the z-axis to optimize its performance. For example, in atomic force microscopy, the z-axis distance between the tip of scanning probe microscope and the sample, known as the "tip-sample" distance, determines the forces that dominate tip-sample interaction, and therefore the imaging mode.

The process of positioning a scanning probe microscope (as opposed to obtaining topography measurements) is often called the "approach." The approach may be divided into two parts: the coarse approach (greater than 100 microns distant from the sample) and the fine approach (less than 100 microns distant from the sample).

Most scanning probe microscopes operate with one SPM device scanning the sample of interest at a time, so the approach is only conducted along the Z-axis. When more than one SPM device is used to simultaneously scan a sample, each SPM device must be positioned within a certain distance of the sample for it to operate properly. For a 1-dimensional array (i.e., a linear array) of SPM devices, positioning in two axes (the X-axis and the Z-axis) is required. For a 2-dimensional array, positioning in three axes is necessary.

In accordance with the present teachings, the surface topography (shape) of a sample is determined so that the position of each MEMS SPM device of the MEMS SPM array can be positioned within an optimal separation distance relative to the sample. There are two techniques used herein to determine the position or necessary relative motion of the MEMS SPM array to position it optimally as possible, identified below as "Methodology 1" and "Methodology 2".

Methodology 1: Separate Surface Topography Measurements. The first technique is to use (or supplement with) separate surface topography measurements that may be unrelated to MEMS SPM arrays or any probe-related methods. Examples of such methods of determining the surface topography of a sample (in the millimeter to several meters size range) at a low to medium resolution (millimeter to micron range) include optical methods (e.g., reflectometry, interferometry [including white light interferometry], time-of-flight), pneumatic sensing, thermal sensing, and electrical sensing (such as capacitive sensing)).

An advantage of this technique (i.e., using a separate surface topography measuring technique) is that it speeds positioning the MEMS SPM array by knowing, in advance of positioning, the surface topography of the sample. A disadvantage is that it does not directly determine the relative position or deviation of each of the plural MEMS SPM devices to the sample, and thus necessitates a second topography measurement of the MEMS SPM array, and a calculation or some method to determine the optimal positioning.

One way to address this is to measure the topography of the sample and the topography of the MEMS SPM array independently, and create a computer model of both. Then, a least-squares minimization or other optimization technique can be applied to determine the ideal positioning of the MEMS SPM array to the sample in up to 6 axes: X, Y, Z, θ1, θ2, θ3.

X axis-left to right
Y axis-front to back
Z-axis-up and down
θ1 axis-rotation around the Z-axis
θ2 axis-rotation around the X axis
θ3 axis-rotation around the Y axis This approach is a global "optimization" of the position of the (overall) array of MEMS SPM devices. Consequently, some of the individual MEMS SPM devices may be intentionally positioned in a relatively less-ideal position so that other individual MEMS SPM devices of the MEMS SPM array will be positioned more relatively more ideally. A second disadvantage of this methodology is that during the actual positioning, the sample and/or MEMS SPM array may deform. Thus, the topography during measurement and the topography during actual positioning may be different. This can be due to effects such as small thermal fluctuations or mechanical stresses applied to the sample or MEMS SPM array during transfer or positioning. Furthermore, it may be difficult to determine the relative position of the two elements during positioning.

Methodology 2: Using Feedback from the MEMS Array. The second methodology is to use the MEMS SPM array, or some portion of it, to determine the necessary relative motion to optimize its own position. That is, feedback from the elements of the MEMS SPM array is used to optimally position the array relative to the sample. An advantage of this methodology is that it is real-time, and can account for any change in the global, long-range topography of either the MEMS SPM array or sample during positioning. Moreover, this approach directly measures the relative positioning of the two elements. A disadvantage of this method, at least historically, pertains to the limitations of the MEMS SPM array, which typically possesses a limited sensing-distance range.

Some methods in accordance with the present teachings for mitigating this limited sensing-distance disadvantage are disclosed below. A combination of Methodology 1 and Methodology 2 may be used to mitigate the disadvantages of each such methodology. For example, in some embodiments, the first methodology is used to get the "coarse" positioning (greater than 100 μm from the sample), and a "fine" positioning readjustment (less than 100 μm from the sample) is performed using Methodology 2.

Many methods for position sensing of MEMS devices have been proposed in the prior art. Examples include force sensing (atomic force microscopy (AFM)), thermal sensing (scanning thermal microscopy, SThM), optical sensing (scanning nearfield optical microscopy (SNOM)), acoustic (scanning acoustic microscopy), electrical capacitance (scanning capacitance microscopy), reflected radiofrequency signals (scanning microwave microscopy), etc. These and other methods can be used for measuring feedback when positioning a MEMS device relative to a sample, but with certain key limitations; namely: (1) a limited sensing distance and (2) a sensitivity to properties of the sample other than topography.

AFM, for example, is only sensitive to sample topography, but typically requires very close proximity to the sample in commonly used operation modes, such as contact mode, tapping (intermittent-contact) mode, and non-contact mode (typically less than about 20 nanometers). Methods that use electromagnetic, optical, acoustic, thermal, or other sensing methods can position a probe further from the sample, but they are sensitive to other properties of the sample, and thus may not give an accurate topography or distance measurement if the sample is inhomogeneous.

Squeeze-Film Damping (SFD) for "Approach." SFD is a damping force that arises when a cantilever, membrane, etc., approaches a surface. This damping force results from compression of a surrounding medium (e.g., air, another gas, or liquid), as caused by the approach of the cantilever, membrane, etc. The force being intentionally sensed in an AFM system is typically the very short-range van der Waals (VDW) interaction between a probe tip and substrate (<20 nm). On the other hand, SFD is an effect that can be sensed at a longer range (from about 20 nm to about 100 μm), and typically dominates at micron-scale interaction ranges (from about 1 to about 100 μm), as opposed to VDW forces, which typically arise at interaction ranges of <20 nm.

In typical AFM, SFD is an undesired effect as it convolutes the tip-sample interaction with cantilever-sample interaction. The cantilever typically possesses a much larger surface area than the probe tip; consequently, the cantilever-sample interaction is a much lower resolution interaction. The SFD force is proportional to the velocity of the cantilever; as such, a very small cantilever oscillation amplitude is typically used to minimize the cantilever velocity in tapping-mode AFM so that this contribution is negligible.

In accordance with the illustrative embodiment, and unlike the prior art, squeeze film damping (SFD) is used as a distance-sensing "approach" mode for MEMS SPM arrays.

In this new mode of operation described herein, the cantilever of a MEMS SPM device is intentionally driven at high-amplitude oscillations to use SFD when sensing the topography of the sample at a distance range of microns. These high-amplitude oscillations are in the range of about 1 to about 5 μm, which is about 10-50× greater than standard tapping-mode AFM, and 100-1000× greater than non-contact mode AFM. Using SFD in this manner (SFD "approach mode") solves the aforementioned limited detection-range issue of SPMS.

The SFD "approach mode" can be used whenever a MEMS array requires z-axis positioning, including all SPM modes (e.g., force sensing (atomic force microscopy (AFM)), thermal sensing (scanning thermal microscopy, SThM), optical sensing (scanning nearfield optical microscopy (SNOM)), acoustic (scanning acoustic microscopy), electrical capacitance (scanning capacitance microscopy), reflected radiofrequency signals (scanning microwave microscopy), as well as for manipulation (scanning probe lithography (SPL)).

Thus, the array of MEMS SPM devices can itself be used during the approach to provide the distance between the MEMS SPM array and the sample at a relatively large distances (e.g., about 20 nm to about 20 microns). Although there is some loss of resolution in the Z-direction, high resolution is unnecessary for this purpose.

Figure 3A:
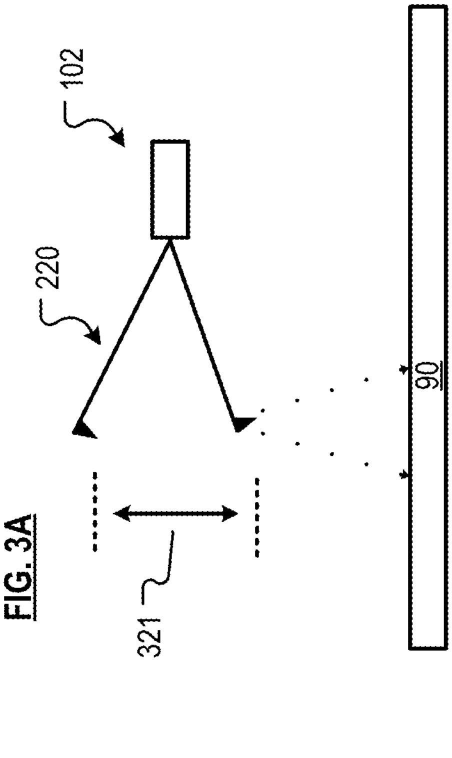
FIG. 3A depicts SPM z-axis distance sensing in accordance with an illustrative embodiment of the invention.
Figure 3B:
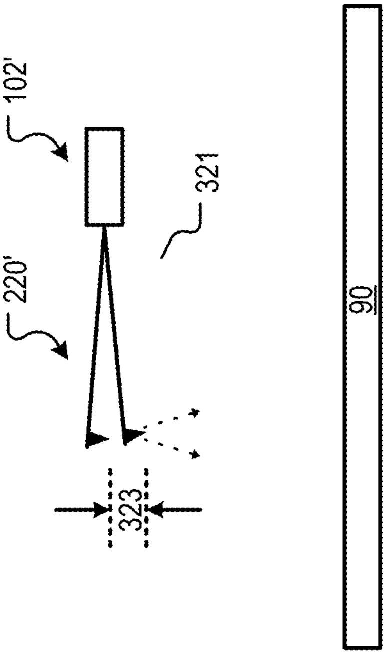
FIG. 3B depicts z-axis distance sensing in accordance with the prior art.

FIGS. 3A and 3B compare SPM z-axis distance sensing for an embodiment of the invention and the prior art, respectively. Specifically, FIG. 3A depicts SPM device 102 in the SFD approach mode with large oscillation 321 (i.e., about 1 to 5 μm) of cantilever 220 for long-range sensing of sample 90 in accordance with the present teachings, whereas FIG. 3B depicts conventional operation of cantilever 220 using small oscillation 323 (i.e., standard tapping mode: 20 to 100 nm; non-contact mode: 0.1 to 10 nm) for short-range sensing of sample 90. (Figures not to scale.)

The required amplitude of oscillation for SFD per the present teachings is very difficult to achieve using bulk piezoelectric drivers, as are used in traditional AFMs, due to the high mass of the drivers. In the illustrative embodiment, electrothermal bimorph CMOS-MEMS devices are used as drivers, which readily achieve the oscillation amplitude required for the SFD approach mode.

Illustrative SFD "Approach" Method for SPM. A method for the SFD approach mode in accordance with the present teachings includes:

- Optionally sensing the global substrate (wafer) topography using white light interferometry;
- Optionally sensing the topography of the MEMS array using white light interferometry;
- Calculating and optimizing the ideal relative position of the MEMS SPM array and wafer using a computer model based on the sensed topographies (optional);
- Coarsely positioning the MEMS SPM array to the wafer to a precision of a few tens of microns, such as by using a 5-axis goniometer;
- Finely positioning the MEMS SPM array to the wafer, using SFD and/or thermal effect, with real-time or near-real-time feedback from elements of the MEMS SPM array. This may be done by updating the previous computer model with this feedback, and reoptimizing the position, moving and sensing, and continuing until a sufficient tolerance is reached;

Q-control, as is known in the art, can be used to adjust the force sensitivity. Although presented in the context of SPM, this method may be used for other applications requiring z-axis positioning of MEMS arrays.

Figure 4:
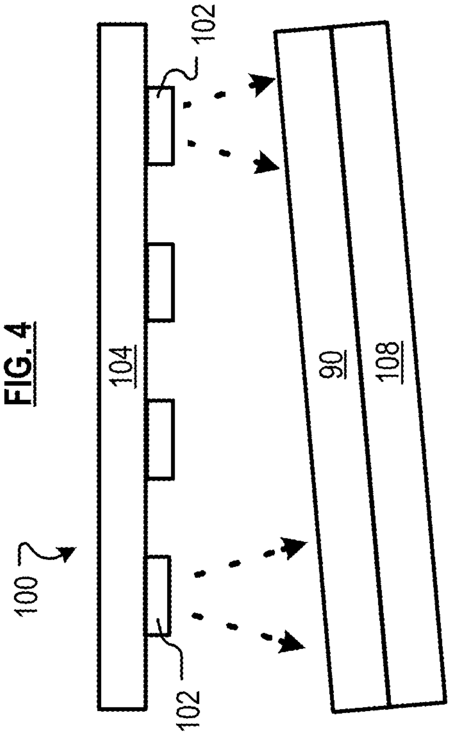
FIG. 4 depicts a MEMS SPM system being used for SFD approach mode, in accordance with the present teachings.

For the method described above, the entire MEMS array or a portion of it (e.g., MEMS elements of the array near the edge of the sample, or simply a few scattered elements in the MEMS array, etc.) may be used to sense the sample during approach. FIG. 4 depicts MEMS SPM system 100 being used for SFD approach. In this simplified illustration, the carrier substrate, which attaches to the backside of wafer 104, is not depicted. In this embodiment, MEMS SPM devices 102 are arranged as a 1D array, wherein sensing is performed via MEMS SPM devices 102 that are located near the edge of sample 90. Goniometer 108, as previously discussed, is shown.

In some embodiments, all MEMS SPM device 102 in the array have the same design. In some other embodiments, individual MEMS SPM devices 102 can differ from one another. For example, in some embodiments, a portion of the array of MEMS SPM devices 102 is designed to have a greater range in the Z-axis, and is optimized for distance sensing of the sample during approach. This is implemented in various ways, including but not limited to:

- Providing periphery- and center-located MEMS SPM devices 102 having longer travel along the z-axis; or
- Having different MEMS SPM device 102 at different locations, such as devices with longer travel along the z-axis interspersed with the shorter, higher-sensitivity MEMS SPM devices 102; or
- Using different MEMS SPM devices 102 with different sensing mechanisms (e.g., different SPM modes).

Another method of measuring the topography of the MEMS SPM array is to utilize a portion or the entirety of the MEMS SPM devices in the array on a reference sample having a known topography.

In some embodiments, the device that holds the substrate (i.e., wafer chuck) or the MEMS SPM array is measured in lieu of or in addition to measuring the sample and/or MEMS SPM array directly.

Sensing Components, in addition to the MEMS SPM array. A third methodology for positioning a MEMS SPM array relative to a sample is to add specific components to either the MEMS SPM array, MEMS SPM array holder, sample, or sample holder (i.e., wafer chuck), which can be used in lieu of, or supplement, the real-time or near-real-time feedback of the MEMS SPM devices themselves. These can be either active components or passive components. They may include, without limitation:

- gyroscopes or accelerometers, and matched pairs thereof;
- capacitive sensors that sense the change in capacitance between the MEMS SPM array and the sample;
- electromagnetic-signal generators, such as lasers or RF emitters, the output of which is reflected to determine the relative distance using strategies including interferometry or time-of-flight; and
- active sites such as a "beacon" that emits a signal on one side, such as electrical, RF or optical signal, which is received on the other side and used to determine the distance between the emitter and detector.

Approach/Conforming. Global relative positioning of the MEMS SPM array and sample can be achieved with a 6-axis goniometer that adjusts the positioning of the MEMS SPM array and/or sample along the X, Y, Z, θ1, θ2, and θ3 axes. But this only minimizes the 0th and 1st order errors. Any higher-order errors, and any deviation between an individual MEMS SPM device and the local area on the sample that it is sensing must also be corrected. Methods for addressing these higher-order errors and/or deviations are presented below.

Another consideration in SPM distance sensing is a need to maintain a fixed or known distance between each individual MEMS SPM device and the sample, irrespective of the high-resolution topographic features (i.e., small features) that are being read. This improves the fidelity of data collection by the MEMS SPM devices by either minimizing or knowing the mechanical noise from the environment or other sources within the equipment.

Perhaps the simplest method to conform a MEMS SPM array to a sample is to actuate each individual MEMS SPM device in the z-axis. Possible methods of such actuation include, but are not limited to:

Electrothermal (e.g., trampoline actuators, bimorph cantilever and actuators, chevron out of plane actuators, etc.).

Electrostatic/capacitive (e.g., interdigitated pairs, trampoline actuators, pad on cantilever, etc.).

Piezoelectric (e.g., unimorph, multimorph, trampoline, etc.).

The MEMS SPM devices will typically be actuated along the z-axis, but this may not be sufficient to correct for the total error caused by the sum of the curvature of the MEMS SPM array and sample depending on the usable z-range of the MEMS SPM array. To correct for all higher-order curvature of the sample, the MEMS SPM devices must have actuation along the z-axis greater than or equal to the total thickness variation/total height variation (TTV/THV) of the sample being interrogated. As this may not be always possible depending on the design of the MEMS SPM devices, alternate and supplemental methods may be used, as described below.

One method is to apply independent motors, actuators, flexure, or other mechanisms for independently controlling individual or groups of MEMS SPM devices along the z-axis, and possibly additional axes. One such flexure-based method is described in US2018/0321276, incorporated by reference herein.

A second method is to place the MEMS SPM devices or groups of MEMS SPM devices on a flexible membrane or other deformable substrate or holder which is flexed or deformed by mechanical, thermal, pneumatic, hydraulic, piezoelectric, electrically deformable polymers or other means of actuation.

Alternatively, or additionally, the sample to be scanned can be deformed. Either the sample can be directly deformed, or a deformable chuck or sample holder can be used to control the shape of the sample to match a certain curvature as optimized by the computer model (as previously discussed). The target curvature can either be to target the most planar shape, the known shape of the MEMS SPM array, or a specific shape that improves the performance of the MEMS SPM array scanner, or any other target. This can be achieved with a multitude of methods including mechanical, thermal, pneumatic, hydraulic, piezoelectric, electrically deformable polymers or other means of actuation.

In addition to deformation along the z-axis, in some embodiments, sample 90 may be deformed along other axes so that the MEMS SPM devices are aligned therewith, and can "land" on specific areas of the sample. Alternatively, the dimensions of carrier substrate 106 can be altered.

In an illustrative embodiment, thermal effects are used to control the shape of the sample, via one or more of the following methods:

local thermal control with pixels or areas of individual control;

global thermal control where the entire surface is controlled simultaneously.

Figure 5B:
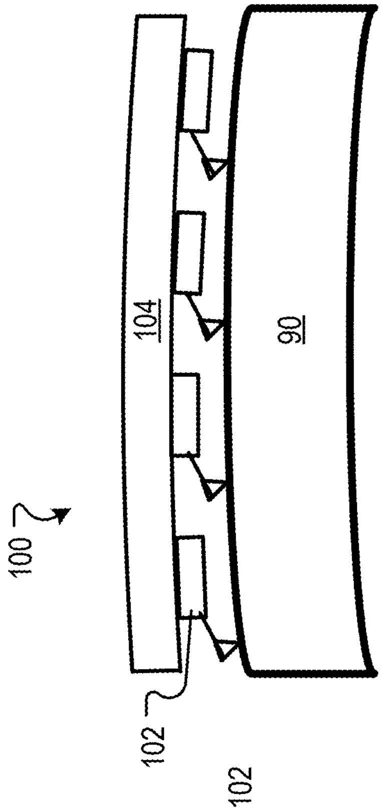
FIG. 5B depicts an array of MEMS SPM devices conforming to a curved sample by bending the carrier substrate to match the curve of the sample.
Figure 5A:
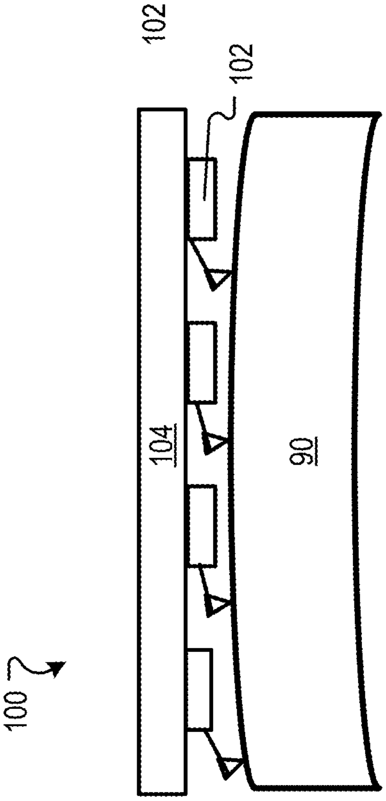
FIG. 5A depicts an array of MEMS SPM devices conforming to a curved sample via differing amounts of movement in the z direction of the cantilevers of the MEMS SPM devices.

FIGS. 5A and 5B depict an array of MEMS SPM devices 102 conforming to curved sample 90. FIG. 5A depicts differing amounts of movement in the z direction for cantilevers 220 in the various MEMS SPM devices 102 to conform to the bow in sample 90. In the embodiment depicted in FIG. 5B, carrier substrate 106 (not depicted; see FIG. 1A) is curved so as to curve wafer 104, and hence the array of MEMS SPM device 102, to substantially match the curvature in sample 90. Carrier substrate 106 may be curved, for example, by creating a temperature gradient (across the carrier substrate). This will alter the dimensions of wafer 104, and the positioning, for example in the x-y plane, of MEMS SPM devices 102.

Additionally, independent motors, actuators, flexure, or other mechanisms as may occur to those skilled in the art in light of the present disclosure, may suitably be used to independently control individual MEMS SPM devices, or groups thereof, along the z-axis, and/or x-y axes, and/or θ1, and/or θ2, and/or θ3 axes.

Maintaining or Measuring Relative Distance During Operation. Data from one or more of the sensing methods previously described may be used as feedback to adjust the relative positioning of the MEMS SPM array in real-time or near-real time, or as a known correction factor for the data measured by the array to correct for drift or vibration.

There are multiple methods to achieve this, for example using optical interferometers or capacitive sensors. Alternatively, elements within the MEMS SPM array or the entire MEMS SPM array can be used. For example, some areas on a sample being interrogated can be flat or intentionally left un-patterned, so that a MEMS SPM device taking measurements at that location will not encounter any topography signal, and only measure any relative motion between the MEMS SPM array and sample, which can be used to correct for any external sources of drift or noise. If there are no areas on the sample that can be guaranteed to be planar, the MEMS SPM device can be made to scan in only one location and not laterally, and thus achieve the same effect; that is, only measure and deflect along the z-axis.

In some embodiments, the use of any specialized MEMS SPM devices for this purpose is avoided, relying on the fact that all MEMS SPM devices in the array are scanning simultaneously. Assuming that all the MEMS SPM devices are scanning different topographical features, any noise will present itself as the same input mechanical signal to all the MEMS SPM device simultaneously. The noise can then be subtracted from the overall signal, thereby providing a signal that is representative of the substrate topography or features to be measured. This effectively achieves noise reduction with signal processing, but no additional software.

Finally, to aid in the relative positioning of the MEMS SPM array and sample, methods of contacting the MEMS SPM array or MEMS array holder with the sample or sample holder can be used. This contact will aid in not only relative positioning, but will also improve the consistency and stability of the relative positioning. Rather than having the MEMS SPM array and sample free to vibrate individually, this will effectively shunt or "short" the mechanical path to improve mechanical stability. Additional contact force may be added to significantly enhance stability.

Figure 6A:
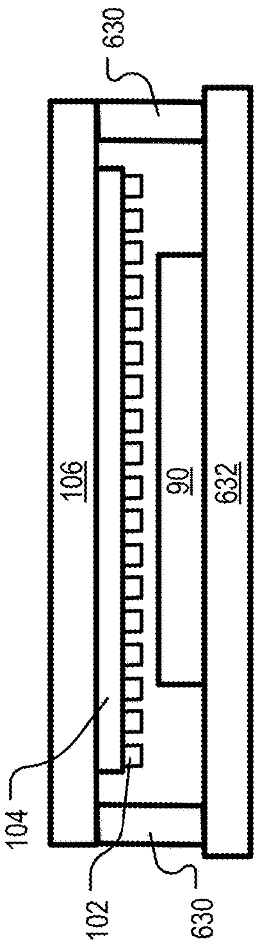
FIG. 6A depicts, via a cross sectional view, an alternative embodiment of a MEMS SPM system including a spacer ring, in accordance with the present teachings.

Traditional approaches to this issue include a gantry for atomic force microscopy, and to use force in the case of MEMS probe cards. In accordance with an illustrative embodiment, a spacer ring is used around a circular MEMS SPM array or MEMS array holder. This is depicted in FIG. 6A (cross section) and FIG. 6B (plan view). In the illustrative embodiment, spacer ring 630 is positioned near the periphery of the MEMS SPM system, sandwiched between carrier substrate 106 and chuck 632. In various other embodiments, spacer ring 630 is positioned between carrier substrate 106 and sample 90, between wafer 104 and chuck 632, and between wafer 104 and sample 90. The thickness of spacer ring 630 is based on the ideal distance between the MEMS SPM devices 102 and sample 90. Again, the intent is to "short" the mechanical path while enabling positioning of the array of MEMS SPM devices 102 with respect to sample 90.

The ideal distance between MEMS SPM devices 102 and sample 90 typically depends on the z-axis range of MEMS SPM devices 102. The z-axis range of the MEMS SPM device may be a function of one of more of: actuator materials/modulus, actuation voltage, cantilever length, and membrane width/diameter, among other parameters. In some embodiments, the distance is "optimized" such that at zero actuation of spacer ring 630, the average actuation of MEMS SPM devices 102 is at the center of the MEMS actuation range.

Figure 6B:
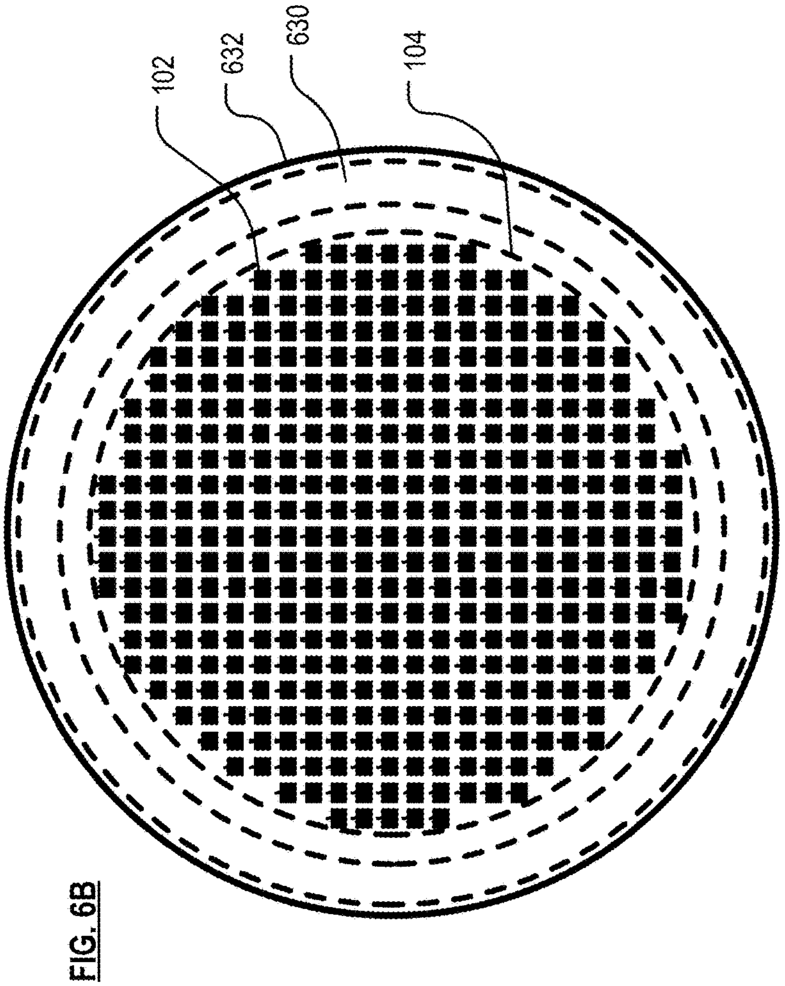
FIG. 6B depicts, via a plan view, the MEMS SPM system of FIG. 6A.

In the illustrative embodiment depicted in FIGS. 6A and 6B, spacer ring 630 is passive. In some other embodiments, spacer ring 630 can be active, such as being actively expanded or contracted, to tilt the MEMS SPM array to compensate for variations of the height of the sample along the Z, and θ2, θ3 axes. In embodiments in which spacer ring 630 is active, it may be controlled via a processor based on responses from the array of MEMS SPM devices 102 or other sensors. Such control is preferably, but not necessarily, performed in real time.

Examples of active implementations of spacer ring 630 includes a ring of piezo stacks or other elements that can be controlled in thickness electrically, thermally, or otherwise. In some embodiments, spacer ring 630 comprises an electroactive polymer. In some embodiments, spacer ring 630 is a ring of MEMS devices. In some embodiments, spacer ring 630 comprises segmented pneumatic or hydraulic devices. In some embodiments, spacer ring 630 comprises linear drive motors that drive very precise drive screws. More generally, spacer ring 630 may comprise any actuatable arrangement/structure/material that can resist the amount of force that is pushing the array of MEMS SPM devices 102 downwardly to maintain equilibrium in the system.

In addition to functioning to "short" the mechanical path, thereby drastically improving the stability of the array of MEMS SPM devices 102, the use of an active embodiment of spacer ring 630 reduces the requirements for goniometer movement. That is, rather than requiring a very expensive, heavy, and complex 5-axis stage, a less complex 3-axes or perhaps 2-axes plus theta rotation stage can be used, since an active spacer ring can do the goniometric and Z-axis coarse positioning.

Figure 7A:
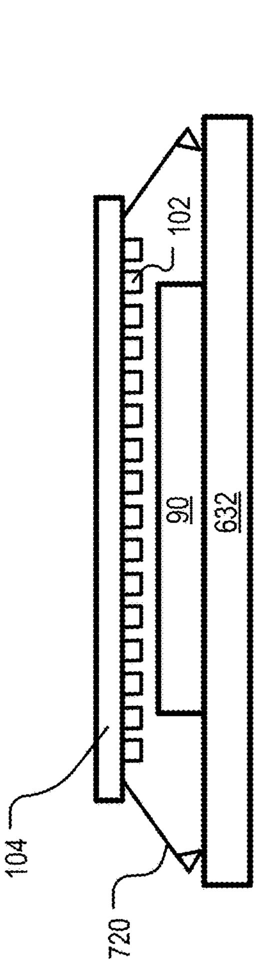
FIG. 7A depicts, via a cross sectional view, a further alternative embodiment of a MEMS SPM system including cantilevers at the perimeter of the wafer, in accordance with the present teachings.
Figure 7B:
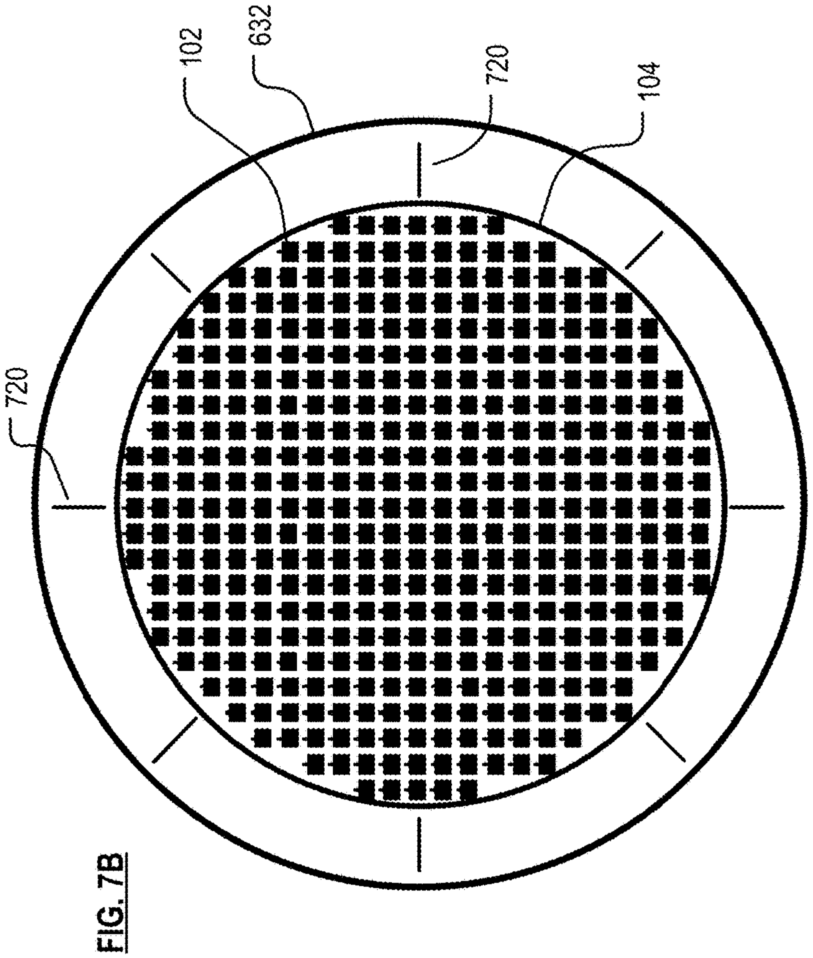
FIG. 7B depicts, via a plan view, the MEMS SPM system of FIG. 7A.

In a further embodiment depicted in FIG. 7A (cross section) and FIG. 7B (plan view), a plurality of MEMS devices having a relatively longer cantilever 720 than cantilever 220 (see FIG. 2) of MEMS SPM devices 102 are positioned at the perimeter of wafer 104 or at various predetermined locations across wafer 104. Like spacer ring 630, the MEMS devices having relatively longer cantilevers 720 are used for the purpose of controlling the relative distance between MEMS SPM devices 102 and sample 90. In some embodiments, rather than using MEMS devices with longer cantilevers 720, the cantilevers are the same for all devices.

Scanning and Manipulation. The methods of sensing topographic differences between the sample and MEMS SPM array, and conforming/adapting the array and/or sample to each other are ultimately to enable the MEMS SPM array to be able to effectively sense the local properties of the sample. Such properties include, but are not limited to: topographic, mechanical, optical, electrical, magnetic, piezo response, material, etc. Moreover, such methods also enable the MEMS SPM array to manipulate the sample (such as via scanning probe lithography).

Most sensing techniques (SMM, SCM, SThM, SNOM, SAM) can measure the topography of a materially homogenous sample. For a non-homogenous sample, the ideal method to measure topography independently of other material properties is AFM. There are three commonly known modes of AFM operation:

1. Contact-mode
2. Intermittent-contact (tapping) mode
3. Non-contact mode

Figure 8A:
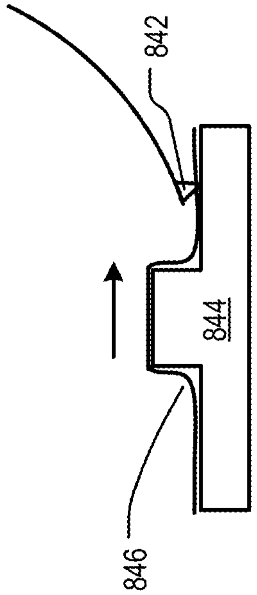
FIG. 8A Prior Art
FIG. 8A depicts the prior-art "contact" mode of operation of an AFM probe.
Figure 8B:
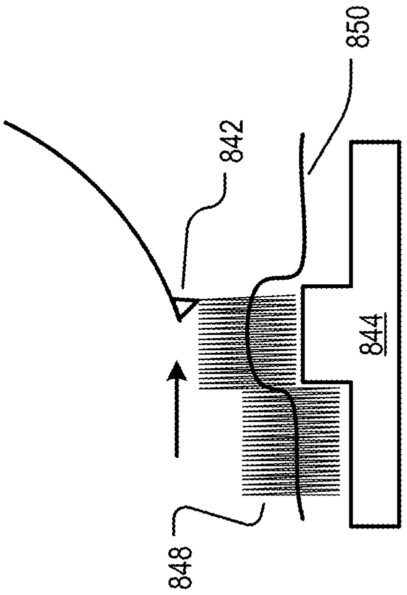
FIG. 8B Prior Art
FIG. 8B depicts the prior-art "tapping" mode and "non-contact" modes of operation of an AFM probe.

FIGS. 8A and 8B, based on illustrations appearing at https://www.maxiv.lu.se/beamlines-accelerators/support-labs/microscopy-labs/atomic-force-microscope/afm-scanning-modes, depicts traditional operational modes of AFM. Squeeze film damping (SFD), as utilized in accordance with embodiments of the invention, dominates at a much greater distance between sample and probe, and is not shown in these Figures.

FIG. 8A depicts the prior-art "contact" mode of operation wherein AFM probe tip 842 remains in contact with sample 844, following along path 846 (a gap is shown between path 846 and sample 844 for clarity). FIG. 8B depicts "tapping" mode and "non-contact" mode. Path 848 depicts tapping mode, wherein probe tip 842 is intermittently in contact with sample 844, oscillating as shown. And path 850 depicts the non-contact mode, wherein there is no contact between probe tip 842 and sample 844.

Contact-mode is typically not practical for most applications other than biology, due to high tip-sample forces, which causes a rapid dulling of AFM probe tip 842 (due to contact with the hard surface of the sample). Intermittent contact mode AFM solves some of these problems by oscillating or tapping tip 842 on sample 844, eliminating most of the lateral forces acting on the tip at the cost of reduced bandwidth. However, it still relies on contacting the sample, and thus risks probe damage.

Both the contact-mode and the intermittent-contact modes rely on sensing the repulsive VDW tip-sample interactions. For semiconductor applications, the most used and best mode of operation is the "non-contact" mode, which relies on sensing the attractive VDW interaction, wherein the tip vibrates at approximately 0.5-2 nm from the substrate. However, the non-contact mode fails when sample topography is very rough, and requires an extremely low-vibration environment where the tip-sample distance is guaranteed.

To address these limitations, methods in accordance with the present invention: (i) measure wafer topography without contact, and (ii) do so far away from the sample, but at the cost of some resolution. This is achieved by utilizing (once again) the squeeze-film damping effect. It is notable that here, SFD is used for "imaging"; that is, collecting a topographic map of the surface. This is in contrast to using SFD for Z-position detection, as previously discussed. Alternatively, or additionally, thermal interactions may be used for surface imaging of the sample.

Traditionally, SFD has been a nuisance for topography determination via AFM because it convolutes the signal with the van der Waals interactions. Conventionally, the impact of SFD is minimized by using a small amplitude for tip oscillation (less than 100 nm), and thus low tip velocity in the Z-axis, and minimum tip-sample distance less than 10 nm.

In contrast, in accordance with the present teachings, by using a tip-sample distance of greater than 20 nm, and typically greater than 1 um, and a large amplitude for tip oscillation (greater than 100 nm), the van der Waals ("vdW") interaction can be made to account for less than 10% of tip-sample interaction force, allowing SFD to dominate.

Table 1 below summarizes the various conventional modes as well as the new modes disclosed herein (i.e., SFD and thermal interaction), the distance range at which such modes operate, the amplitude of cantilever tip oscillation, and the operational regime.

TABLE 1

| MODE | DISTANCE TO SAMPLE | CANTILEVER AMPLITUDE | OPERATION REGIME |
|---|---|---|---|
| Contact mode | Less than 0.5 nm | 0 nm | Repulsive vdW |
| Tapping mode | 0.5 to 2 nm | 20 to 100 nm (typical) | Repulsive vdW |
| Non-contact mode | 0.1 to 10 nm | 0.1 to 10 nm | Attractive vdW |
| SFD mode | ~20 nm to 100 μm | ~50 nm to 100 μm (typically: 1 to 10 μm) | Squeeze film |
| Thermal interaction | ~20 nm to 100 μm | ~0 nm to 100 μm (typically: 1 to 10 μm) | Thermal |

The sensitivity of a MEMS SPM device in the SFD regime depends on the shape of the cantilever. The geometry of the cantilever on the MEMS SPM device can be changed to improve sensing in the SFD regime. Such as, for example, by using a relatively wider cantilever, or a square, circular, or other-shaped structure on the end of the cantilever that provides a larger sectional surface area than a simple cantilever. Methods exist to increase the force exerted on the cantilever when in the SFD regime, such as changing the temperature or humidity of the medium (usually air), or changing the medium itself, such as using a gas other than air (e.g., xenon, etc.), or using a liquid.

There are several options for imaging the surface of the sample. One option is to use a conventional approach, wherein a laser beam detects cantilever deflections towards or away from the surface of the sample. By reflecting an incident beam off the flat top of the cantilever, any cantilever deflection will cause slight changes in the direction of the reflected beam. A position-sensitive photodiode (PSPD) can be used to track these changes. Thus, when the tip of the cantilever of one of the MEMS SPM devices passes over a raised surface feature, the resulting cantilever deflection (and the subsequent change in direction of reflected beam) is recorded by the PSPD. The topography of a sample surface is imaged by scanning the cantilevers from plural MEMS SPM devices over a region of interest. The raised and lowered features on the sample surface influence the deflection of the cantilevers, which is monitored by the PSPD. Controlling the height of the cantilever tip above the surface as previously discussed, thus maintaining constant laser position, the MEMS SPM array system can generate an accurate topographic map of surface features.

In accordance with the present teachings, in another detection method, the MEMS SPM devices in the array include an integrated piezoresistive element. The strain on the piezoresistive element causes the resistance to change, which is correlated to the distance. The topography of the surface of a sample is imaged by scanning the cantilevers from plural MEMS SPM devices over a region of interest. The raised and lowered features on the sample influence the deflection of the cantilevers, which, in this method, is monitored by the changes in the resistance of the piezoresistive element. Controlling the height of the tip of the cantilever above the surface as previously discussed, thus maintaining constant strain (or constant amplitude, or another control variable), the MEMS SPM array system can generate an accurate topographic map of surface features.

Computation and Data Processing. Because the MEMS SPM array is manufactured via a CMOS-MEMS process, each "cell" of the MEMS SPM array may include the MEMS device, volatile-memory, a memory controller, and digital logic. As part of the digital logic, some minimal amount of local computation may be present (arithmetic logic units). The data may be accessible via an array-wide (or on-wafer) high-speed interconnect. Low-cost memory in the form of volatile digital registers (only a few configuration bytes) included in the same cell as the MEMS SPM device can aid in reading/writing control commands for individual configuration of a single cell or a group of cells.

It is to be understood that the disclosure describes a few embodiments and that many variations of the invention can easily be devised by those skilled in the art after reading this disclosure and that the scope of the present invention is to be determined by the following claims.

What is claimed:

1. A method for z-axis positioning of a plurality of MEMS devices, the method comprising:

positioning the plurality of MEMS devices at least 20 nanometers from a surface of a sample being interrogated;

oscillating a part of at least some of the MEMS devices, wherein a magnitude of the oscillation is in a range of about 50 nanometer to 100 microns; and sensing a distance between said at least some MEMS devices and the surface of the sample.

2. The method of claim 1 wherein the magnitude of oscillation is in a range of about 1 micron to about 10 microns.

3. The method of claim 1 wherein the tip of each of the at least some MEMS devices does not contact the surface of the sample.

4. The method of claim 1 wherein positioning the plurality of MEMS devices comprises obtaining topography measurements of the sample.

5. The method of claim 4 wherein obtaining topography measurements of the sample comprises a method selected from the group consisting of: optical, including reflectometry, interferometry, time-of-flight, confocal, and non-optical, including pneumatic sensing, thermal sensing, and electrical sensing.

6. The method of claim 1 wherein positioning the plurality of MEMS devices comprising using feedback from the MEMS devices.

7. The method of claim 1 comprising maintaining a first distance between the part of said at least some MEMS devices and the surface of the sample by conforming a surface on which the MEMS devices reside to a curvature of the sample.

8. The method of claim 1 wherein maintaining a first distance between the part of said at least some MEMS device and the surface of the sample comprises positioning a spacer ring around the plurality of MEMS devices.

9. The method of claim 8 comprising actively changing a thickness of the spacer ring to level the plurality of MEMS devices with respect to the surface of the sample.

10. The method of claim 1 wherein maintaining a first distance between the part of said at least some MEMS device and the surface of the sample comprises positioning a plurality of actively controlled actuators proximal to the plurality of MEMS devices, wherein the actuators apply a varying amount of force to level the plurality of MEMS devices with respect to the surface of the sample.

11. The method of claim 1 comprising detecting a change in a control variable of said at least some MEMS devices, the change in the control variable being correlatable to a change in distance between the part of said at least some MEMS devices.

12. The method of claim 1 wherein the part is a probe.

13. The method of claim 12 wherein the probe is a tip disposed on a free end of a cantilever.

14. The method of claim 1 wherein positioning the plurality of MEMS devices comprises positioning the MEMS devices in an x-y plane by altering at least one of the sample and a carrier substrate.

15. The method of claim 1 wherein a signal from each MEMS device is compared to the signal from each other MEMS device to identify noise and isolate the noise.

* * * * *